Sept. 14, 1937.     C. B. FOWLER     2,093,316
COFFEE MAKER
Filed May 1, 1935
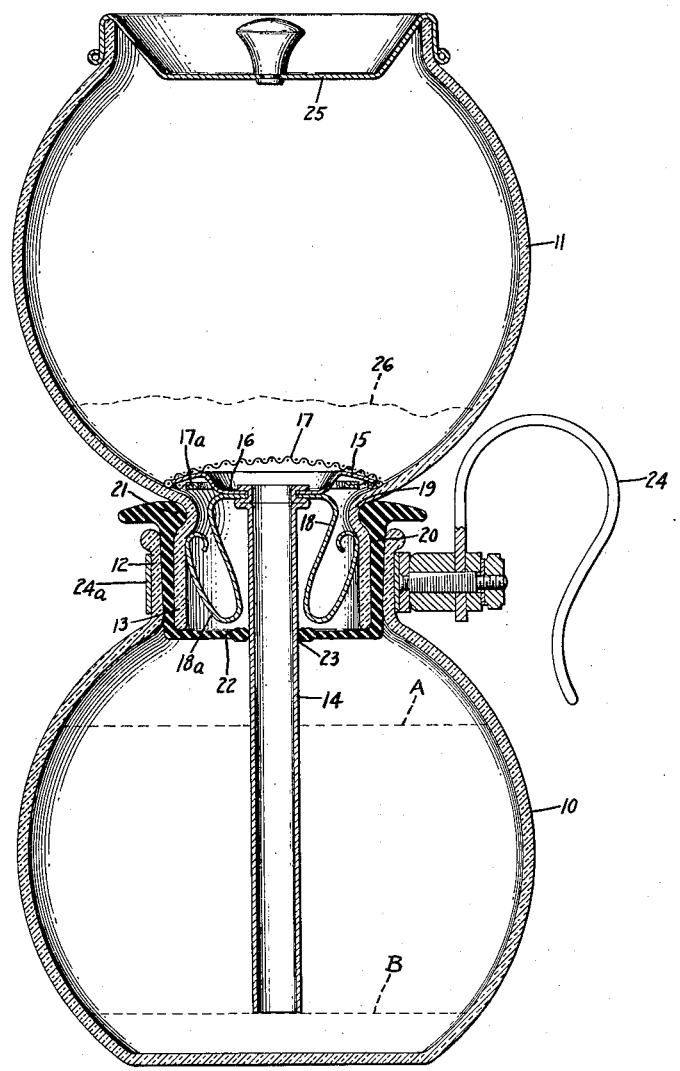
Inventor:
Clarence B. Fowler,
by Harry E. Dunham
His Attorney.

Patented Sept. 14, 1937

2,093,316

UNITED STATES PATENT OFFICE 2,093,316

COFFEE MAKER

Clarence B. Fowler, Bridgeport, Conn., assignor to General Electric Company, a corporation of New York Application May 1, 1935, Serial No. 19,215

5 Claims. (Cl. 53—3)

This invention relates to coffee makers, and it has for its object the provision of an improved device of this character.

More specifically, this invention relates to coffee makers which are provided with a lower bowl and an upper bowl, together with a tube projecting from the upper bowl into the lower bowl so as to connect the two bowls together. A filter upon which the coffee grounds are placed is supported in the upper bowl over the mouth of the tube. In the operation of coffee makers of this character, water is placed within the lower bowl and is heated to boiling. The pressure of the steam and air above the water level forces the water up through the tube into the upper bowl where the coffee is steeped or infused. When the heat is removed from the lower bowl, the steam in the lower bowl condenses and the pressure is thereby reduced sufficiently to permit the liquid in the upper bowl to return through the filter to the lower bowl.

The connection between the two bowls must be steam tight to prevent loss of pressure from the lower bowl, and it is one of the objects of this invention to provide an improved seal between the upper and lower bowls.

Another object of this invention is the provision of improved tubular connection means between the two bowls.

In accordance with this invention, in one form thereof, the tubular member connecting the two bowls is detachable and is secured to the upper bowl by means of suitable resilient means. The upper bowl is provided with a lower open extension that is received in the neck provided for it in the upper portion of the lower bowl, and through which the tubular member extends. The diameter of the tubular member preferably will be considerably smaller than that of the extension member on the upper bowl.

A steam and air-tight seal is effected between the two bowls by means of a resilient gasket which has a part interposed between the neck on the lower bowl and the extension on the upper bowl, and further, with a diaphragm extending inwardly and engaging the tubular member connecting the two bowls. The resistance to flexure of the diaphragm is sufficient to prevent steam which collects in the lower bowl from passing up the outside of the tubular member and through the filter, whereby all of the steam pressure generated in the lower bowl is utilized to force the water in this bowl up through the tubular member into the upper bowl. The resistance of the diaphragm, however, is not so great as to prevent flexure of the diaphragm to permit the coffee brew to flow down from the upper bowl on the outside of the tube when heat is removed from the lower bowl. In other words, when heat is removed from the lower bowl and the steam therein condenses, the coffee brew is permitted to flow down both through the tubular member and also about the outside of this member.

For a more complete understanding of this invention, reference should be had to the accompanying drawing in which the single figure is a vertical sectional view of a coffee maker embodying this invention.

Referring to the drawing, this invention has been shown in one form as applied to a coffee maker comprising a lower water heating vessel or bowl 10 and an upper coffee infusion or steeping vessel or bowl 11. The lower bowl 10 is provided at its upper portion with an upright neck 12 within which an open extension 13 provided on the lower portion of the upper bowl 11 is received. It will be observed that the neck 12 and the extension 13 have relatively large diameters. Preferably, the lower and upper bowls will be formed of glass.

The upper bowl 11 is connected with the lower bowl 10 by means of a tubular member 14 which, as shown, projects down into the lower bowl to a point near the bottom thereof. This member is formed of a suitable metal, such as monel metal, or an alloy of nickel and silver. The tubular member 14 at its upper end is provided with an annular disc 15, the outer edge of which rests upon the bottom of the upper bowl, as shown. The disc 15 is provided, at its center, with a depressed portion 16, which is secured to the upper end of the tube 14. The depressed portion 16 functions somewhat as a funnel to direct liquid in the upper bowl 11 into the tube 14. A filter 17 formed of cloth, fine metal mesh, or some other suitable material is secured over the mouth of the funnel 16. It is preferable that the filter cover the entire upper area of the disc 15 and be wrapped about its edges, the edges 17a of the filter being secured under the disc, as shown.

The tubular member 14 is secured to the upper bowl 11 by means of a plurality of resilient members or springs 18. The springs 18, as shown, are provided with U-shaped legs 18a, which spring outwardly away from the tube 14, and which are arranged to engage the inner walls of the extension 13. The upper bowl 11 is provided with an inwardly projecting bead or shoulder 19 formed at the juncture of the lower wall of the upper bowl and its extension 13. This bead may be and preferably will be formed by pressing the wall of the glass inwardly, as shown. The outer arms of the legs 18a bear against the extension 13 directly under this bead 19. It will be observed that the bead 19, therefore, is sandwiched between the disc 15 resting on the bottom wall of the upper bowl and the leg 18a. By reason of this arrangement, the tubular member 14, the disc 15 and the filter 17 are detachably secured to the upper bowl 11 and may be readily removed therefrom by pushing the tube 14 up through the extension 13.

In order to effect an air-tight, steam-tight seal between the upper and lower bowls, a suitable gasket 20 is provided, and arranged, as shown, to surround the extension 13 of the upper bowl and to be received in the neck 12 of the lower bowl. This gasket is formed of a suitable flexible substance, such as rubber. The gasket is secured to the upper bowl by means of an inwardly extending flange or bead 21 formed at its upper end and received in the recess provided on the outside of the upper bowl by the inturned or depressed portion forming the bead 19. The gasket is tapered downwardly, as shown, to pemit the upper bowl to be readily removed from the lower bowl. The neck 12, of course, will flare outwardly somewhat, while extension 13 will taper downwardly so that these members accommodate the tapering gasket 20.

The gasket 20, as shown, extends downwardly through the full length of neck 13 and at its lower end is provided with a diaphragm or inwardly extending portion 22 which is arranged substantially at right angles to the main downwardly extending portion of the gasket. The diaphragm 22 is provided at its center with an aperture 23 which receives the tubular member 14.

The lower bowl 10 is provided with a handle 24, which is secured to the neck 12 in any suitable manner, as by means of a metallic band 24a embracing the neck 12 and to which the handle is secured.

The upper bowl 11 is provided with a suitable cover 25.

It will be understood that in the operation of coffee makers of this type the coffee grounds 26 will be placed in the upper bowl above the filter 17, while water will be placed in the water heating bowl 10 up to a suitable level, such as the level indicated by the letter A. It will be understood that the amount of coffee placed within the upper bowl and the amount of water placed within the lower bowl will depend upon the number of cups it is desired to make. After the coffee and water have been supplied, heat is applied to the lower bowl, as by means of a suitable electric hot plate (not shown), so as to bring the water placed therein up to the boiling point. The steam that is generated above the level A and also the heated air above this level will eventually generate a pressure so great that the water in the lower bowl will be forced up through the tube 14 and through the filter 17 into the upper bowl 11 where the coffee grounds 26 are placed. As long as the heat is applied, the water will continue to flow into the upper bowl until it reaches the level indicated by the letter B at the lower end of the tube 14. The water will remain in the upper bowl to infuse the coffee until the heat is removed to permit the lower bowl to cool. After this happens, the steam in the lower bowl 10 will condense and thereby reduce the pressure therein sufficiently to cause the coffee brew to flow down into the lower bowl through the coffee grounds and the filter 17 by atmospheric pressure and gravity.

The pressure which is generated in the vessel 10 above the water level during the heating period is not sufficiently great to move the diaphragm 22 from its position shown in the drawing and, therefore, is not sufficiently great to permit leakage or loss of pressure through the diaphragm on the outside of the tube 14 and up through the filter between the edge of the disc 15 and the bottom of the upper bowl. In other words, the diaphragm prevents the loss of pressure around the edges of the filter disc during the heating up period. However, when the heat is removed from the lower bowl and the steam therein condenses, the coffee brew in the upper bowl does not return merely through the tube 14, but returns by two paths: one through the tube 14 and the other around the edges of the disc 15 and down into the lower bowl through the annular passage through the tube 14 and the extension 13. Coffee brew is permitted to flow down on the outside of the tube 14 because when the steam condenses, it creates a vacuum in the lower bowl and the atmospheric pressure above the diaphragm is so great that it is not able to withstand it. In other words, it is caused to move downwardly away from the tube 14 and thereby provide a passageway through which coffee brew can flow. Because of this arrangement, all of the coffee brew above the disc 15 is permitted to return to the lower bowl.

When the coffee brew has been made and returned to the lower bowl, the upper bowl, together with the tube 14 and gasket 20, are removed from the lower bowl, and the coffee then poured from the lower bowl 10 by using the handle 24.

For the purpose of cleaning the device, the tube 14 together with its disc 15 and filter 17 may be removed from the upper bowl, and not replaced until it is desired to again make coffee.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A coffee maker comprising a water heating vessel, a steeping vessel, a tubular member placing said vessels in fluid communication, and a flexible diaphragm surrounding said tubular member engaging said member to prevent the loss of pressure from said heating vessel to said steeping vessel outside of said tubular member, but to be flexed on said member to provide for the passage of fluid from said steeping to said heating vessel when the pressure in said latter vessel is reduced by condensation of steam in said vessel.

2. A coffee maker comprising a lower water heating bowl having a relatively large neck, an upper infusion bowl having an open extension arranged to be received in said neck, a tubular member secured in said extension, a flexible gasket within said neck surrounding said extension so as to effect a steam-tight seal between said bowls, said gasket having at its lower end a flexible diaphragm extending inwardly to engage said tubular member to prevent the loss of pressure from the heating bowl to the infusion bowl outside of the tubular member, but flexing on the member to provide for the passage of fluid from the infusion to the heating bowl when the pressure in the latter bowl is reduced by condensation of steam in the bowl.

3. A coffee maker comprising a lower water heating bowl having a neck extending upwardly therefrom, an upper bowl having a depending open extension adapted to be fitted to said neck, a detachable tube having a relatively small diameter as compared with that of said extension extending through said extension to said lower bowl and provided at its upper end with an annular disc resting on the bottom of said upper bowl, a filter secured to said disc covering the upper end of said tube, a rubber gasket surrounding said extension and fitted within said neck, and a rubber diaphragm formed integrally with said gasket extending inwardly therefrom and surrounding and engaging said tube arranged to prevent the escape of pressure from said lower bowl to said upper bowl outside of said tube, but to be flexed from said tube to provide for the passage of fluid from said upper to said lower bowl when the pressure in said lower bowl is reduced by condensation of steam in said lower bowl.

4. A coffee maker comprising a lower water heating bowl having a neck extending upwardly therefrom, an upper bowl having a depending open extension adapted to be fitted into said neck, a detachable tube provided at its upper end with a member resting on the bottom of said upper bowl, a filter secured to said member covering the upper end of said tube and a metallic spring secured to said tube and engaging a portion of said upper bowl to releasably secure said tube to said upper bowl.

5. A coffee maker comprising a lower water heating bowl having a neck extending upwardly therefrom, an upper bowl having a depending open extension adapted to be fitted into said neck, a detachable tube provided at its upper end with a member resting on the bottom of said upper bowl, a filter secured to said member covering the upper end of said tube and a spring secured to the upper end of said tube having a plurality of resilient legs bearing against the inner walls of said open extension to releasably secure said tube to said upper bowl.

CLARENCE B. FOWLER.